No. 729,529. PATENTED JUNE 2, 1903.
L. W. BENNER.
SAFETY THILL BOW OR THILL TUG AND HOLDBACK.
APPLICATION FILED FEB. 18, 1902.
NO MODEL.
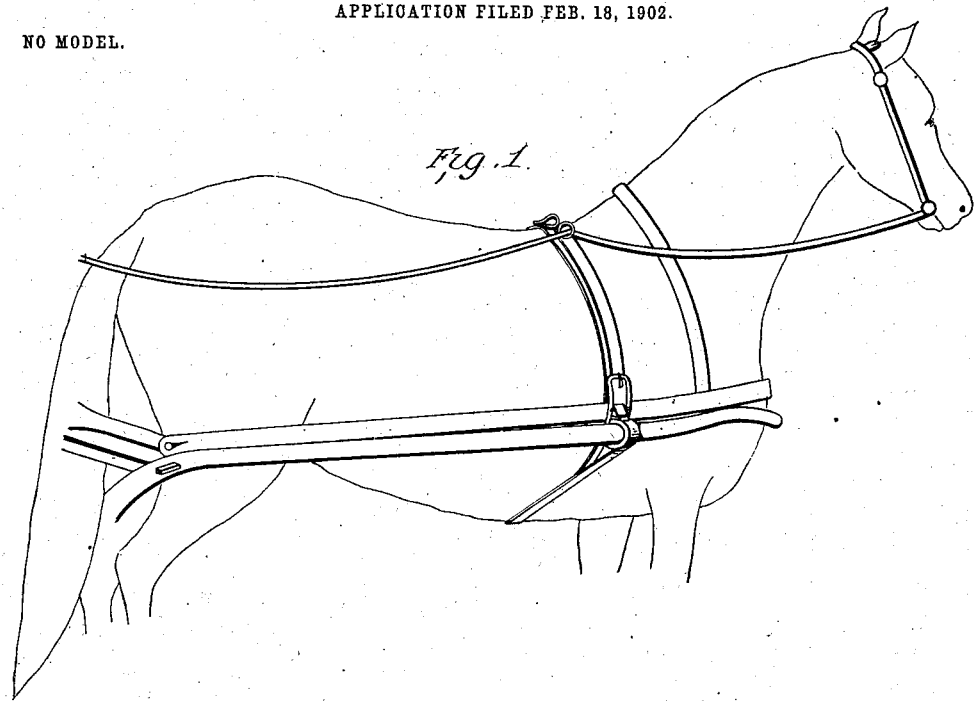
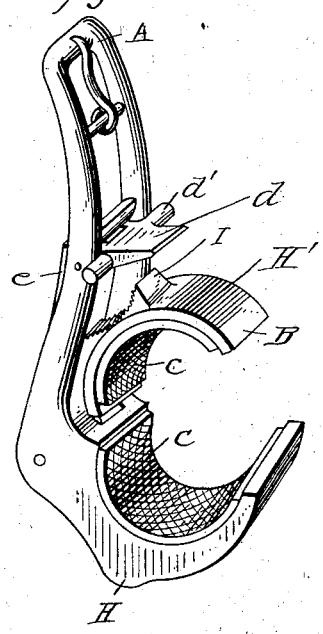
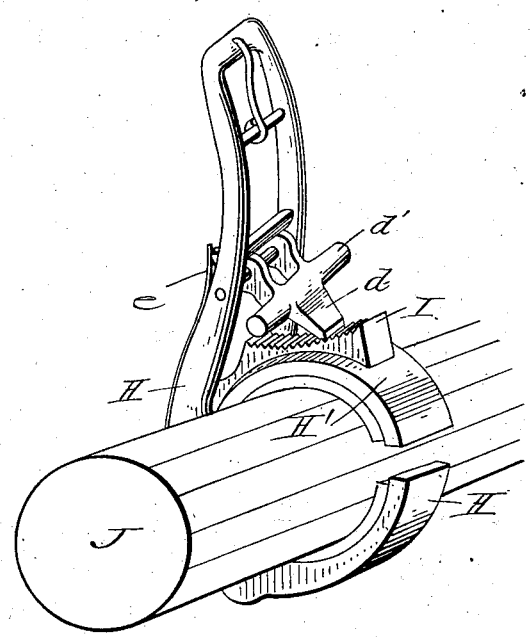

No. 729,529. Patented June 2, 1903.

UNITED STATES PATENT OFFICE.

LAFAYETTE W. BENNER, OF ROCKLAND, MAINE.

SAFETY THILL-BOW OR THILL-TUG AND HOLDBACK.

SPECIFICATION forming part of Letters Patent No. 729,529, dated June 2, 1903.

Application filed February 18, 1902. Serial No. 94,641. (No model.)

*To all whom it may concern:*

Be it known that I, LAFAYETTE W. BENNER, a citizen of the United States, residing at Rockland, Maine, have invented certain new and useful Improvements in Safety Thill-Bows or Thill-Tugs and Holdbacks, of which the following is a specification.

This invention relates to improvements in tugs for the support of vehicle-thills and in certain combination of parts which make unnecessary under some circumstances parts of the harness and an added safeguard in others in case of accident to those parts when in use. To this end I have provided a tug which may be readily attached to any harness and applied to any ordinary thill and which when in place will give such positive grip on the thill as to firmly retain it, avoid any slipping, and yet be capable of instantaneous adjustment and release.

In the drawings, Figure 1 represents my invention as applied to the thill in use. Fig. 2 is a view of one form of my tug in open position. Fig. 3 represents the same clamped on the thill.

As may be seen in Fig. 1, my tug is buckled into the thill-girth as an ordinary loop and is clamped upon the thill at about its usual place of support. In general the tug consists of a hook-shaped body portion H, of suitable metal, with an upwardly-extending shank having at its upper end a buckle A, which gives it easy hang and facilitates its application to any harness. Pivoted to this hook-body is the latch H', opening upon the release of its fastening sufficiently to allow the ready withdrawal of the thill. An inner lining or packing C is provided for the hook and latch to supply a proper gripping-surface. This is preferably of rubber or other material which will yield slightly upon tightening the catch, thereby giving a frictional bind upon the thill and at the same time reacting with the adjustable catch to hold it firmly latched. To secure a tight grip upon the thill, take up any wear, and give a partial compression to the surface C, I provide adjustable fastenings upon the latch.

In Figs. 2 and 3, $d$ is a ratchet-dog pivoted upon the shank of the hook H and acted on by a leaf-spring $e$, which, bearing upon the tail of the ratchet, tends to keep said latch closed. This ratchet-tooth, with its beveled end, takes into the notches of the curved rack-surface I upon the latch H' and as it is shoved down, sliding over the notches as the latch yields, finally locks itself in closed position with the thill firmly gripped between latch and hook and the packing C slightly compressed.

$d'$ represents ears upon the detent to stop its backward swing and afford finger-hold to facilitate its release.

Having thus described my invention, what I claim, and desire to secure by Letters Patent, is—

1. A hook-shaped thill-tug, having a shank, a latch thereon and an adjustable dog pivoted to said shank above said latch for engagement therewith.

2. A thill-tug having a shank, a latch pivoted thereto, a dog pivoted to the shank and notches on the latch adjustably engaged thereby.

3. A thill-tug having a shank, a latch thereon, a resilient packing therefor and a dog between said shank and latch.

4. A thill-tug having a pivoted latch, a dog on said tug adjustably engaging said latch and a resilient packing for said latch and tug.

In testimony whereof I affix my signature in presence of two witnesses.

LAFAYETTE W. BENNER.

Witnesses:
E. B. SPEAR,
A. L. RICHARDSON.